(12) United States Patent
Zhao et al.

(10) Patent No.: US 12,119,503 B2
(45) Date of Patent: Oct. 15, 2024

(54) CAP ASSEMBLY AND SECONDARY BATTERY

(71) Applicant: Contemporary Amperex Technology Co., Limited, Ningde (CN)

(72) Inventors: Fenggang Zhao, Ningde (CN); Yuqun Zeng, Ningde (CN); Jian Guo, Ningde (CN); Quankun Li, Ningde (CN); Peng Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/237,902

(22) Filed: Aug. 25, 2023

(65) Prior Publication Data

US 2023/0411744 A1     Dec. 21, 2023

Related U.S. Application Data

(63) Continuation of application No. 16/976,752, filed as application No. PCT/CN2019/105714 on Sep. 12, 2019, now Pat. No. 11,777,162.

(30) Foreign Application Priority Data

Sep. 19, 2018 (CN) .......................... 201821535665.2

(51) Int. Cl.
| | |
|---|---|
| H01M 50/148 | (2021.01) |
| H01M 50/176 | (2021.01) |
| H01M 50/55 | (2021.01) |
| H01M 50/553 | (2021.01) |
| H01M 50/588 | (2021.01) |
| H01M 50/593 | (2021.01) |

(52) U.S. Cl.
CPC ....... *H01M 50/148* (2021.01); *H01M 50/176* (2021.01); *H01M 50/55* (2021.01); *H01M 50/553* (2021.01); *H01M 50/588* (2021.01); *H01M 50/593* (2021.01)

(58) Field of Classification Search
CPC .. H01M 50/148; H01M 50/176; H01M 50/55; H01M 50/553; H01M 50/588; H01M 50/593
See application file for complete search history.

(56) References Cited

PUBLICATIONS

CN107302064 translation (Year: 2017).*
CN207233790 translation (Year: 2018).*

* cited by examiner

*Primary Examiner* — Jane J Rhee
(74) *Attorney, Agent, or Firm* — East IP P.C.

(57) ABSTRACT

The present disclosure relates to a cap assembly and a secondary battery. The cap assembly includes a cap plate provided with an electrode lead-out hole; an electrode terminal, covering the electrode lead-out hole and including a main body, wherein the main body is provided with a recess on a side wall; an isolating member including a receiving portion, wherein the main body is received in the receiving portion; and a protrusion, connected to an inner wall of the isolating member and extending towards an axis of the electrode lead-out hole, wherein the protrusion is received in the recess so as to prevent the main body from rotating relative to the isolating member. The cap assembly according to the embodiments of the present application can improve an overcurrent capacity and stability of the electrode terminal.

12 Claims, 7 Drawing Sheets

CAP ASSEMBLY AND SECONDARY BATTERY

CROSS REFERENCE TO RELATED APPLICATIONS

This application is continuous application of U.S. patent application Ser. No. 16/976,752 filed on Aug. 30, 2020, which is a National Phase of the International Application No. PCT/CN2019/105714, filed on Sep. 12, 2019, which claims priority to Chinese Patent Application No. 201821535665.2, tilted "CAP ASSEMBLY AND SECONDARY BATTERY" and filed on Sep. 19, 2018, all of the above-mentioned applications are hereby incorporated by reference in their entireties.

TECHNICAL FIELD

The present disclosure relates to a technical field of batteries, and particularly relates to a cap assembly and a secondary battery.

BACKGROUND

New energy vehicles are widely promoted in China and even in the world, but there are still many things to be improved in order to completely replace fuel vehicles. For example, the vehicle's small mileage and high cost of a battery pack needs to be further solved, and a reliability of the battery pack needs to be further improved. Based on the above problems, higher requirements are put forward for a secondary battery, which is a core part of an electric vehicle, such as higher energy density and lower cost. Currently, a housing of the secondary battery includes a case and a cap assembly. In the current cap assembly, a cap plate is a metal plate and is provided with a through hole. A terminal post includes an extension portion which passes through the through hole and extends out of the cap plate. The extension part is surrounded by an insulating member and a connecting member is disposed above the insulating member. The insulating member is provided with two anti-rotation protrusions on a surface facing the connecting member, and also is provided with a penetration hole located between the two anti-rotation protrusions, wherein the extension portion passes through the penetration hole. However, an aperture size of the penetration hole is limited by the two anti-rotation protrusions, resulting in a small radial dimension of the extension portion and thus a low overcurrent capacity of the extension portion.

SUMMARY

Embodiments of the present disclosure provide a cap assembly and a secondary battery. The cap assembly may improve an overcurrent capacity and stability of an electrode terminal.

On one aspect, the embodiments of the present disclosure propose a cap assembly for the secondary battery, wherein the cap assembly includes: a cap plate, provided with an electrode lead-out hole; an electrode terminal, covering the electrode lead-out hole and including a main body, wherein the main body is provided with a recess on a side wall; an isolating member including a receiving portion, wherein the main body is received in the receiving portion; and a protrusion, connected to an inner wall of the isolating member and extending towards an axis of the electrode lead-out hole, wherein the protrusion is received in the recess so as to prevent the main body from rotating relative to the isolating member.

According to one aspect of the embodiments of the present application, the recess is configured to extend through the main body in a thickness direction.

According to one aspect of the embodiments of the present application, the main body is formed in a cylindrical shape and is provided with a plurality of recesses on the side wall, and the number of the protrusions is equal to the number of the recesses.

According to one aspect of the embodiments of the present application, the isolating member and the protrusion are integrally formed and are made of the same material.

According to one aspect of the embodiments of the present application, the electrode terminal further includes an external connection portion, which is located on a side of the main body facing away from the cap plate, and the main body extends beyond a peripheral surface of the external connection portion.

According to one aspect of the embodiments of the present application, the isolating member is in contact with the main body, and in a thickness direction, a part of the isolating member is located on a side of the main body facing away from the cap plate so as to prevent the main body from moving in a direction away from the cap plate.

According to one aspect of the embodiments of the present application, the cap assembly further includes a connecting member, which is welded with the cap plate and is connected with the main body through the isolating member, the connecting member includes a first connecting portion located on a side of the main body facing away from the cap plate, and a part of the isolating member is located between the first connecting portion and the cap plate.

According to one aspect of the embodiments of the present application, the connecting member further includes an intermediate transition portion and a second connecting portion, the intermediate transition portion is connected between the first connecting portion and the second connecting portion, and the second connecting portion extends away from the main body.

According to one aspect of the embodiments of the present application, the first connecting portion is formed in an annular shape, the intermediate transition portion is formed in a tubular shape, and the second connecting member is formed in an annular shape.

According to one aspect of the embodiments of the present application, the cap plate is provided with a groove, and the second connecting portion is received in the groove, the groove includes a first planar surface and a first arc surface, the second connecting portion includes a second planar surface and a second arc surface, the first arc surface is engaged with the second arc surface while the first planar surface is connected to the second planar surface so as to prevent the connecting member from rotating relative to the cap plate.

The cap assembly according to the embodiments of the present application includes the isolating member and the electrode terminal connected with each other. The isolating member is connected with the recess provided on the electrode terminal through the protrusion, so as to prevent a relative rotation between the isolating member and the main body, keep relative positions of the isolating member and the main body unchanged, and thus ensure a connection stability between the isolating member and the main body. Meanwhile, since the recess is provided on the side wall of the main body of the electrode terminal, and the protrusion engaged with the recess is provided on the inner wall of the isolating member, it is advantageous to reduce restraints and limitations on a radial dimension of the receiving portion by the protrusion, which is conducive to increasing a radial dimension of the receiving portion of the isolating member, and thus a radial dimension of the main body of the electrode terminal, thereby improving the overcurrent capacity of the entire electrode terminal.

On a further aspect, the embodiments of the present disclosure propose a secondary battery, characterized in that, including a case provided with an opening; an electrode assembly accommodated in the case; and a cap assembly according to the above embodiments, wherein the cap assembly is configured to cover the opening to close the case with the electrode assembly therein.

BRIEF DESCRIPTION OF THE DRAWINGS

Features, advantages, and technical effects of exemplary embodiments of the present disclosure will be described below with reference to the accompanying drawings.

Figure 1:
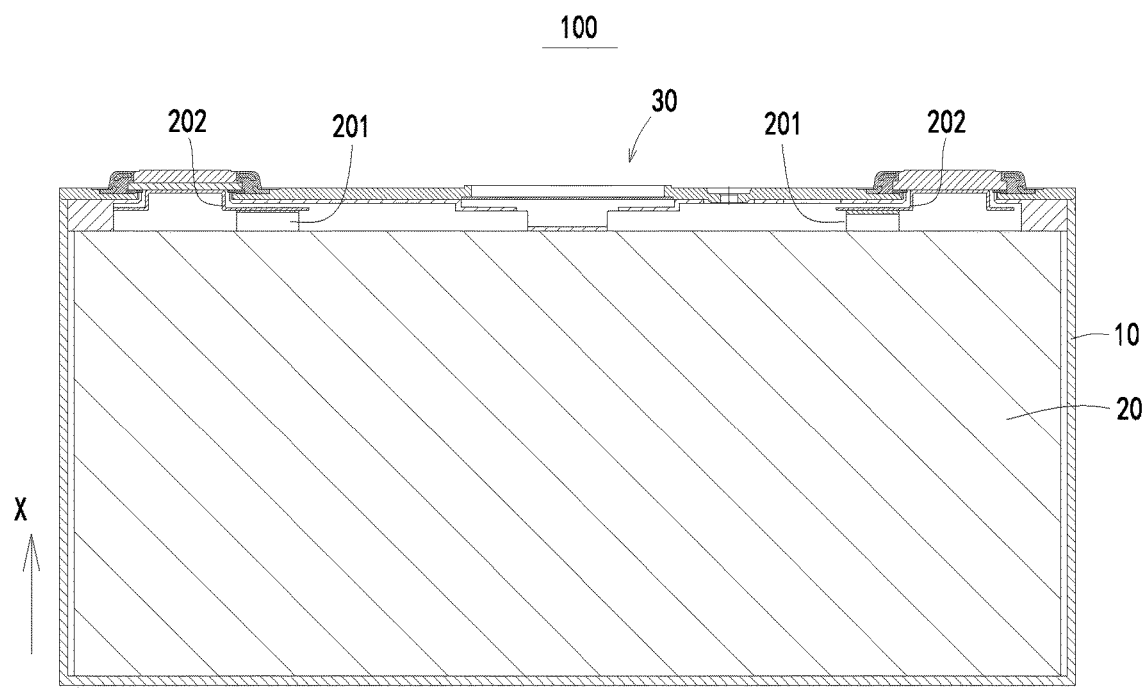
FIG. 1 is a cross-sectional view schematically showing a configuration of a secondary battery according to an embodiment of the present disclosure.

In the drawings, the drawings are not drawn to actual scale.

REFERENCE NUMERALS

100, Secondary battery;
10 case;
20 electrode assembly; 201, tab; 202, connecting piece;
30 cap assembly; 31, cap plate; 311, electrode lead-out hole; 312, groove; 312*a*, first planar surface; 312*b*, first arc surface; 32, electrode terminal; 321, main body; 322, recess; 323, external connection portion; 33, isolating member; 331, receiving portion; 34, protrusion; 35, connecting member; 351, first connecting portion; 352, intermediate transition portion; 353, second connecting portion; 353*a*, second planar surface; 353*b*, second arc surface; 36, sealing member;

X, thickness direction.

DETAILED DESCRIPTION

Below, embodiments of the present disclosure will be further described in detail with reference to the accompanying drawings and embodiments. The detailed description of the embodiments and the accompanying drawings are intended to exemplarily illustrate the principles of the present disclosure and are not intended to limit the scope of the present disclosure. That is, the present disclosure is not limited to the described embodiments.

In the description of the present disclosure, it should be noted that, unless otherwise stated, the meaning of "a plurality" is two or more; the orientations or positional relationships indicated by the terms "upper", "lower", "left", "right", "inner", "outer" and the like are merely for the purpose of describing the present disclosure and simplifying the description, and are not intended to indicate or imply that the device or component referred to has a particular orientation, is constructed and operated in a particular orientation, and therefore cannot be understood as a limitation of the present disclosure. Moreover, the terms "first", "second", "third" and the like are used for descriptive purposes only and are not to be construed as indicating or implying relative importance.

The orientations in the following description refer to directions as shown in the accompanying drawings and are not intended to limit specific structures. In the description of the present disclosure, it should be further noted that, unless otherwise specified and stated clearly, the terms "install", "connect", and "couple" are to be understood broadly, and may be, for example, a fixed connection, a disassemble connection, or an integral connection, and may be a direct connection or an indirect connection via an intermediate medium. The specific meaning of the above terms in the present disclosure can be understood by the person skilled in the art according to actual circumstance.

In order to better understand the present disclosure, a cap assembly and a secondary battery 100 according to the embodiments of the present disclosure are described in detail below with reference to FIGS. 1-10.

Referring to FIG. 1, a secondary battery 100 according to the embodiments of the present disclosure includes a case 10, an electrode assembly 20 disposed within the case 10, and a cap assembly 30 connected with the case 10. The case 10 of the present embodiment is provided with one opening, and thus there is only one cap assembly 30.

The electrode assembly 20 of the present embodiment is constituted by stacking or spirally winding a positive electrode plate, a negative electrode plate and a separator together. The separator is an insulating member disposed between the positive electrode plate and the negative electrode plate. The positive electrode plate and the negative electrode plate each have a sheet for electric conduction, wherein the sheet of the positive electrode plate includes a first coated area coated with a positive active substance and a positive tab not coated with the positive active substance. The sheet of the negative electrode plate includes a second coated area coated with a negative active substance and a negative tab not coated with the active substance. The electrode assembly 20 of the present embodiment includes two tabs 201 (i.e. a positive tab and a negative tab), and both of the two tabs 201 are located on a same side, that is, both are disposed facing the cap assembly 30. The cap assembly 30 of the present embodiment includes a cap plate 31 and two electrode terminals 32 disposed on the cap plate 31. One of the two electrode terminals 32 is used as a positive electrode, which is electrically connected with the positive tab via one connecting piece 202; the other of the two electrode terminals 32 is used as a negative electrode, which is electrically connected with the negative tab via another connecting piece 202. The cap assembly 30 of the present embodiment covers the opening of the case 10 so as to close the case 10 with the electrode assembly 20 therein.

Figure 2:
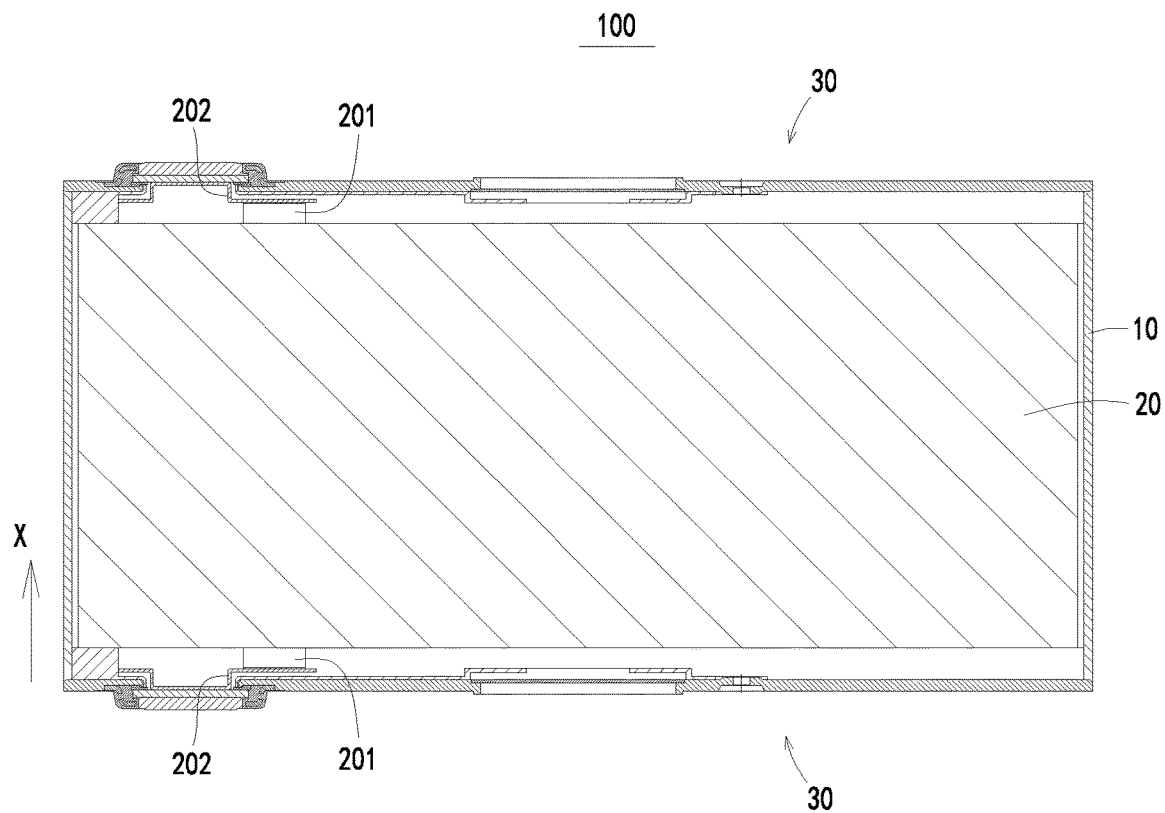
FIG. 2 is a cross-sectional view schematically showing a configuration of a secondary battery according to a further embodiment of the present disclosure.

As shown in FIG. 2, the secondary battery 100 according to the embodiment of the application includes a case 10, an electrode assembly 20 disposed in the case 10 and a cap assembly 30 connected with the case 10. The case 10 of the present embodiment is provided with two openings opposite to each other, and thus there are two cap assemblies 30. The electrode assembly 20 includes two tabs 201, which are disposed on two opposite sides.

The following embodiments describe a configuration of the cap assembly 30 including two electrode terminals 32, but the same configuration also may be applied to the cap assembly 30 including one electrode terminal 32.

Figure 3:
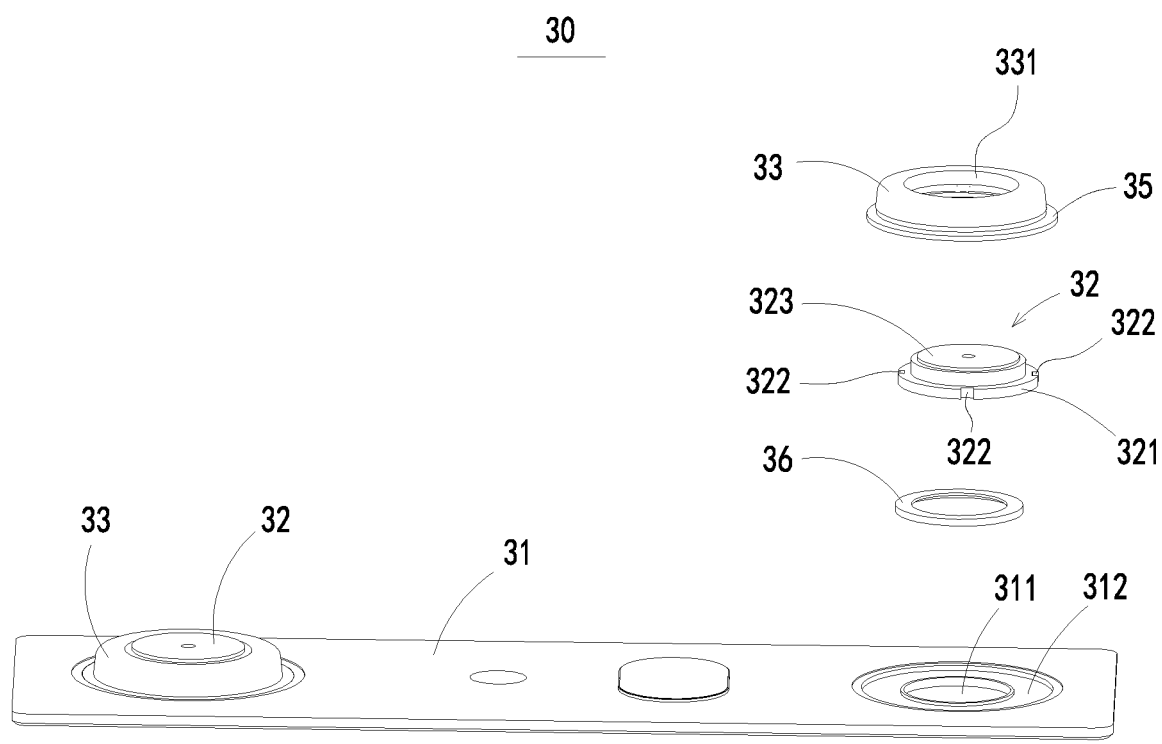
FIG. 3 is a partially exploded view showing a configuration of a cap assembly according to an embodiment of the present disclosure.

As shown in FIG. 3, the cap assembly 30 according to the embodiment of the present application includes a cap plate 31, an electrode terminal 32, an isolating member 33 and a sealing member 36. The cap plate 31 is provided with an electrode lead-out hole 311. The electrode terminal 32 is disposed corresponding to and covers the electrode lead-out hole 311. In the present embodiment, a thickness direction X is the same as an axial direction of the electrode lead-out hole 311. The electrode terminal 32 includes a main body 321, and the main body 321 is provided with a recess 322 on a side wall thereof. The isolating member 33 is provided with a receiving portion 331. The main body 321 is accommodated in the receiving portion 331. The isolating member 33 is connected with the cap plate 31 so that the isolating member 33 may fix the electrode terminal 32. In an embodiment in which the cap plate 31 is made of a conductive material (such as aluminum, stainless steel), the isolating member 33 is made of an insulating material (such as plastic and rubber), so that the electrode terminal 32 and the cap plate 31 are insulated from each other. Alternatively, the isolating member 33 may also be made of a conductive material, for example, a conductive material such as conductive carbon may be incorporated into the insulating material such as plastic and rubber. It is available that only one of the two electrode terminals 32 is insulated from the cap plate 31. The sealing member 36 of the present embodiment is disposed between the main body 321 included in the electrode terminal 32 and the cap plate 31, to seal the cap plate 31 and the main body 321. Alternatively, the sealing member 36 is formed in an annular shape. The sealing member 36 may be made of rubber, silica gel, or other materials.

Figure 4:
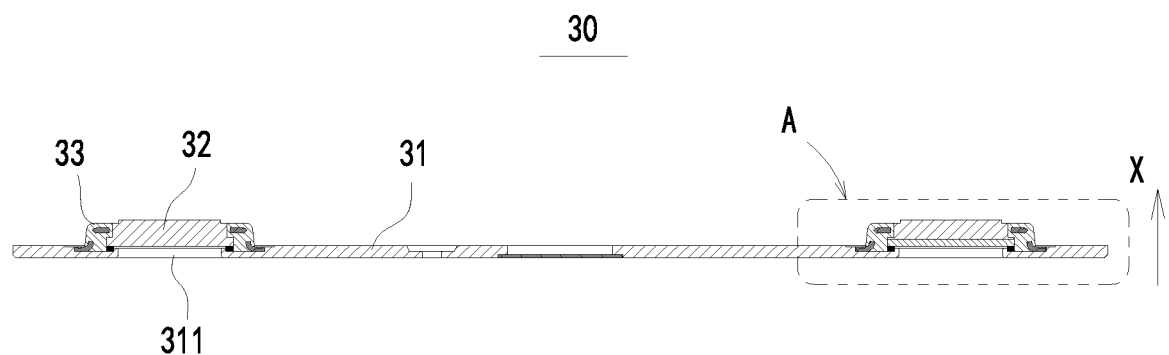
FIG. 4 is a cross-sectional view schematically showing a configuration of a cap assembly according to an embodiment of the present disclosure.
Figure 5:
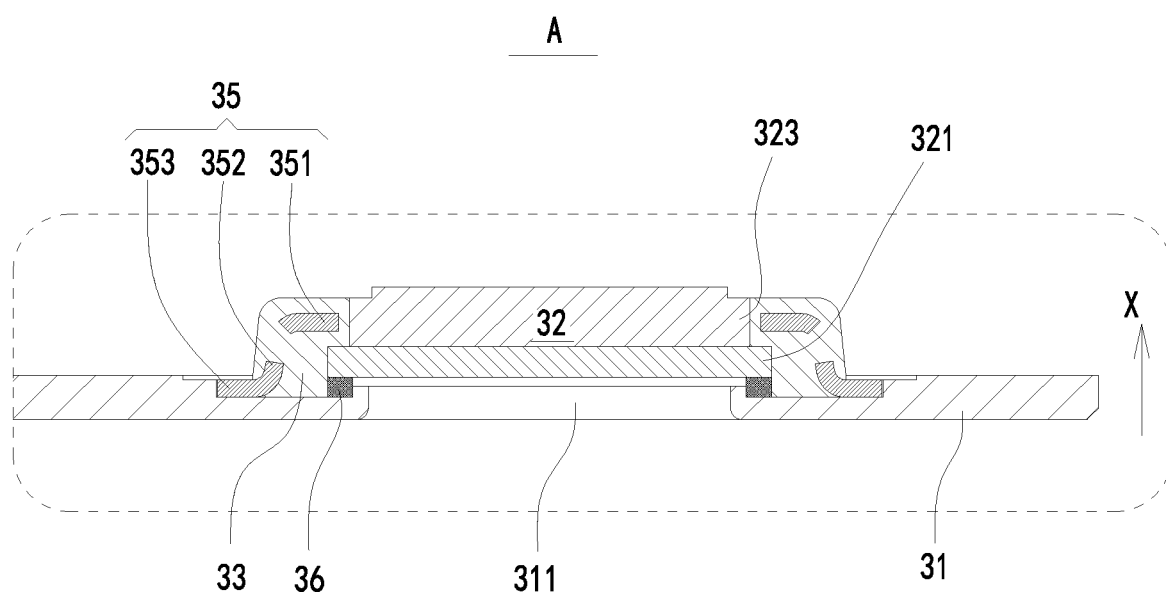
FIG. 5 is an enlarged view of the portion A in FIG. 4.

As shown in FIG. 4 and FIG. 5, the cap assembly 30 of the present embodiment further includes a connecting member 35. The connecting member 35 is connected with the isolating member 33. The connecting member 35 is connected with the main body 321 included in the electrode terminal 32 through the isolating member 33. The connecting member 35 and the electrode terminal 32 are isolated by the isolating member 33, and there is no direct contact between the connecting member 35 and the electrode terminal 32. The connecting member 35 may be made of metal to ensure sufficient connection strength. Further, the connecting member 35 is welded with the cap plate 31 to fix positions of the isolating member 33 and the electrode terminal 32.

The isolating member 33 of the present embodiment is in contact with the main body 321, and in the thickness direction X, a part of the isolating member 33 is located on a side of the main body 321 facing away from the cap plate 31, so that the isolating member 33 applies a force towards the cap plate 31 on the main body 321, and prevent the main body 321 from moving in a direction away from the cap plate 31. In one embodiment, the connecting member includes a first connecting portion 351. The first connecting portion 351 is located on the side of the main body 321 facing away from the cap plate 31, and a part of the isolating member 33 is located between the first connecting portion 351 and the cap plate 31. As such, after fixedly connected with the cap plate 31, the connecting member 35 may apply a force towards the cap plate 31 on the isolating member 33 and the electrode terminal 32 by the first connecting portion 351, so as to tightly compress the electrode terminal 32, ensure the stability of the position of the electrode terminal 32 and further effectively prevent the main body 321 from moving in the direction away from the cap plate 31. Further, since a part of the isolating member 33 is located on the side of the main body 321 facing away from the cap plate 31, a contact area between the isolating member 33 and the main body 321 may be increased. The first connecting portion 351 may increase a compressive force between the isolating member 33 and a surface of the main body 321 facing away from the cap plate 31, and thus increase a frictional force between the isolating member 33 and the main body 321, resulting in that the isolating member 33 and the main body 321 cannot rotate relative to each other easily.

The connecting member 35 of the present embodiment further includes an intermediate transition portion 352 and a second connecting portion 353. The intermediate transition portion 352 is connected between the first connecting portion 351 and the second connecting portion 353. The first connecting portion 351 and the intermediate transition portion 352 are each connected with the isolating member 33. The second connecting portion 353 extends away from the main body 321 included in the electrode terminal 32 and is welded with the cap plate 31.

Figure 6:
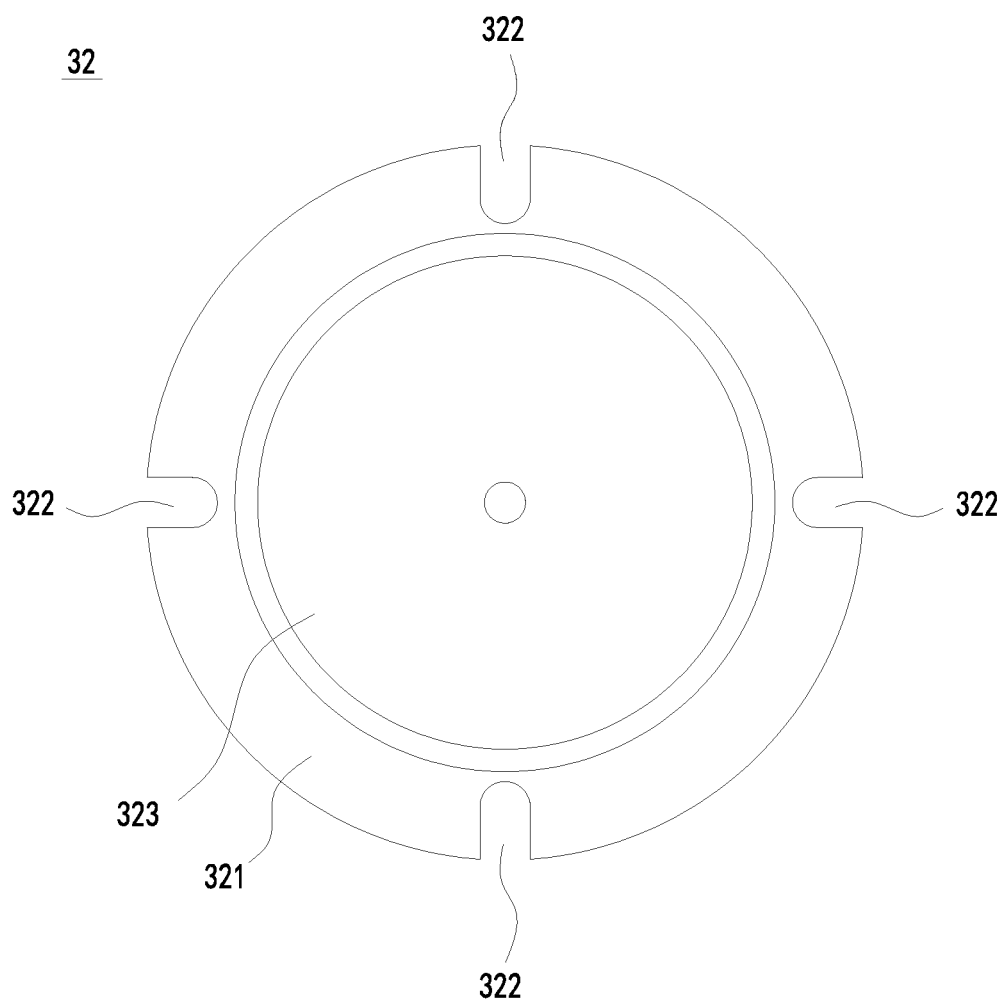
FIG. 6 is a top view showing a configuration of an electrode terminal according to an embodiment of the present disclosure.
Figure 7:
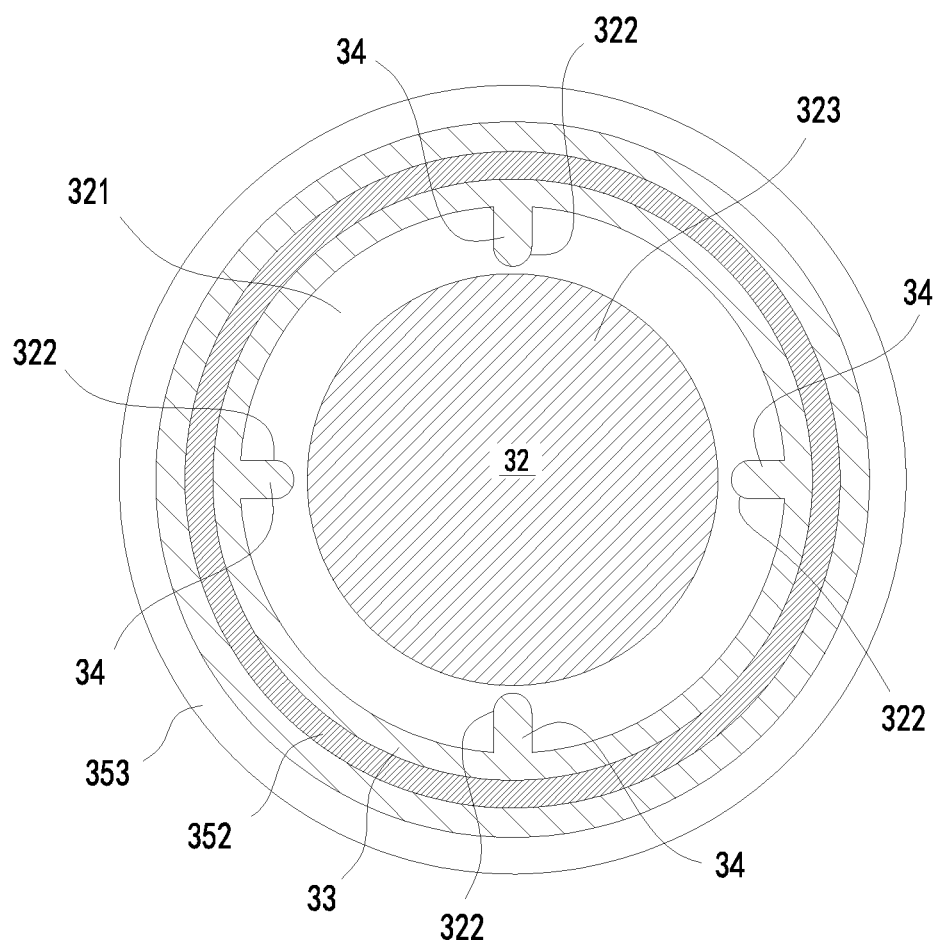
FIG. 7 is a cross-sectional view schematically showing an assembly of an electrode terminal, isolating member and a connecting member.

As shown in FIG. 6, the main body 321 of the present embodiment is formed in a cylindrical shape and is provided with four recesses 322 on the side wall. However, the main body 321 also may be formed in a shape of column with a polygonal cross section, and the number of recesses 322 provided on the main body 321 is not limited to four, but may be other numbers. Preferably, four recesses 322 are uniformly distributed in a circumferential direction of the main body 321. Referring to FIG. 7, the cap assembly 30 of the present embodiment further includes a protrusion 34. The protrusion 34 is connected to an inner wall of the isolating member 33. The inner wall here refers to a surface of the isolating member 33 for defining the receiving portion 331. The inner wall faces the main body 321. The protrusion 34 extends towards an axis of the electrode lead-out hole 311. The protrusion 34 is received in the recess 322 provided on the main body 321. Alternatively, the protrusion 34 is form-fitted with the recess 322, and the number of the protrusions 34 is the same as that of the recesses 322. An engagement of the protrusion 34 and the recess 322 may effectively prevent the relative rotation between the isolating member 33 and the main body 321, thereby ensuring a stability of a relative position between the isolating member 33 and the main body 321. Further, since the recess 322 of the present embodiment is provided on the side wall of the main body 321, and the protrusion 34 engaged with the recess 322 is provided on the inner wall of the isolating member 33, it is advantageous to reduce constraints and limitations on a radial dimension of the receiving portion 331 by the protrusion 34, which is conducive to increasing the radial dimension of the receiving portion 331 of the isolating member 33 and thus a radial dimension of the main body 321 of the electrode terminal 32, thereby effectively improving an overcurrent capacity of the entire electrode terminal 32.

As shown in FIG. 6, the recess 322 of the present embodiment extends through the main body 321 in the thickness direction X. In this way, a contact area between the protrusion 34 and the recess 322 may be increased, and thus a frictional force between the protrusion 34 and the recess 322 may be increased, which is conducive to improving an anti-torsion performance. In one example, the isolating member 33 and the protrusion 34 are integrally formed and are made of the same material, so as to improve a connection strength between the isolating member 33 and the protrusion 34, and thus improve a connection strength between the protrusion 34 and the recess 322. When the isolating member 33 and the recess 34 are integrally formed and are made of plastic materials, the isolating member 33 may be formed between the connecting member 35 and the main body 321 of the electrode terminal 32 by an injection molding process at one time. Alternatively, the isolating member 33 may completely cover the first connecting portion 351 and the intermediate transition portion 352 of the connecting member 35, which may improve a connection strength between the isolating member 33 and the connecting member 35, indirectly improve the connection strength between the protrusion 34 and the recess 322, and improve the stability of the relative position between the isolating member 33 and the main body 321. When forming the isolating member 33 and the protrusion 34 by the injection molding process, since the recess 322 extends through the main body 321, it is beneficial for molten plastic to fully fill the recess 322. If the recess 322 does not extend through the main body 321, the molten plastic tends to incompletely fill the recess 322 during the injection molding process, thereby easily generating cavities or pores between the recess 322 and the protrusion 34, which will reduce the contact area between the protrusion 34 and the recess 322. Therefore, with the recess 322 extending through the main body 321, it is conducive to ensuring the full contact between the protrusion 34 and the recess 322, and thus ensuring the good friction between them.

Figure 8:
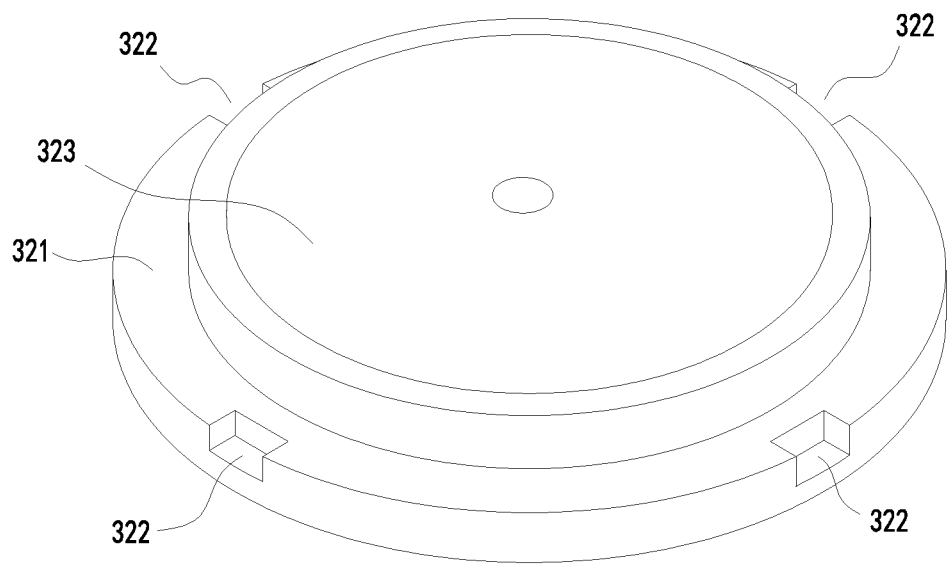
FIG. 8 is a schematic view showing a configuration of an electrode terminal according to an embodiment of the present disclosure.

As shown in FIG. 8, the recess 322 of the present embodiment also may be configured to not extend through the main body 321 in the thickness direction X. When the protrusion 34 of the present embodiment is engaged with the recess 322, on the one hand, it may effectively prevent the isolating member 33 from rotating relative to the main body 321; on the other hand, the protrusion 34 may apply a force towards the cap plate 31 on the main body 321 via the recess 322, so as to make the position of the electrode terminal 32 to be more stable.

Referring to FIG. 3, FIG. 5 and FIG. 8 together, the electrode terminal 32 of the present embodiment further includes an external connection portion 323. The external connection portion 323 extends out of the isolating member 33 to facilitate an electrical connection of the electrode terminal 32 with external components, such as a busbar, via the external connection portion 323. The external connection portion 323 of the present embodiment is located on the side of the main body 321 facing away from the cap plate 31. In a radial direction of the electrode lead-out hole 311, the main body 321 extends beyond a peripheral surface of the external connection portion 323. That is, a projection area of the external connection portion 323 along the thickness direction X is smaller than a projection area of the main body 321 along the thickness direction X, so that a part of the isolating member 33 and the first connecting portion 351 of the connecting member 35 may press against a surface of the main body 321 protruding out of the external connection portion 323. Alternatively, the external connection portion 323 and the main body 321 are each formed in a cylindrical shape.

Figure 9:
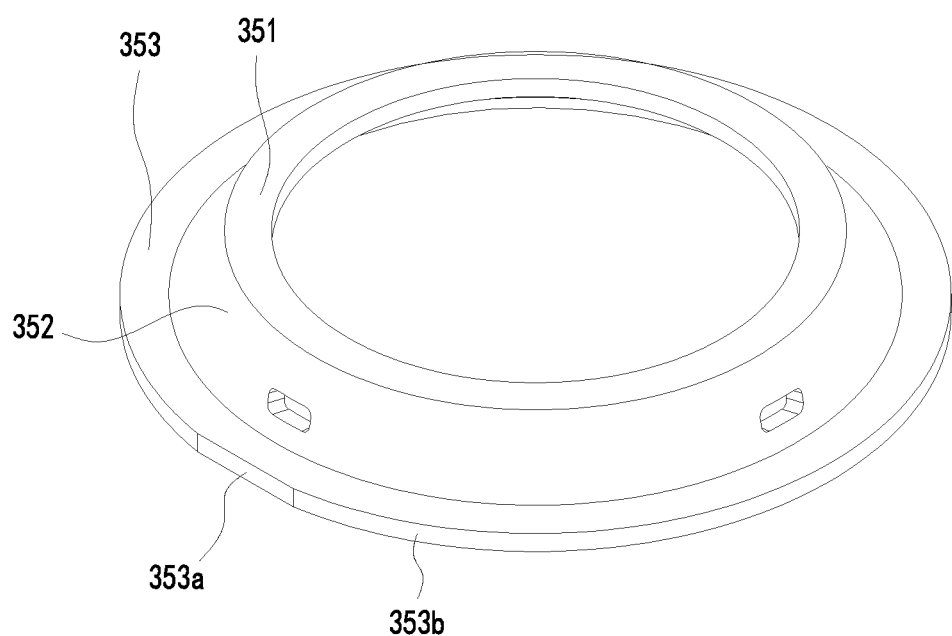
FIG. 9 is a schematic view showing a configuration of a connecting piece according to an embodiment of the present disclosure.

In one embodiment, as shown in FIG. 9, the first connecting portion 351 is formed in an annular shape. The intermediate transition portion 352 is formed in a tubular shape. The second connecting portion 353 is formed in an annular shape. The isolating member 33 is formed in a tubular shape, and the receiving portion 331 in the isolating member 33 is formed as a hole. As such, the isolating member 33 may entirely surround the main body 321 in the circumferential direction of the main body 321, making the contact area between the isolating member 33 and the main body 321 to be larger. Meanwhile, under the tension of the connecting member 35, the circumferential surfaces of the isolating member 33 and the main body 321 contacts with each other more tightly, which increases the frictional force between the isolating member 33 and the main body 321, and further reduces a possibility of relative rotation between the isolating member 33 and the main body 321.

Figure 10:
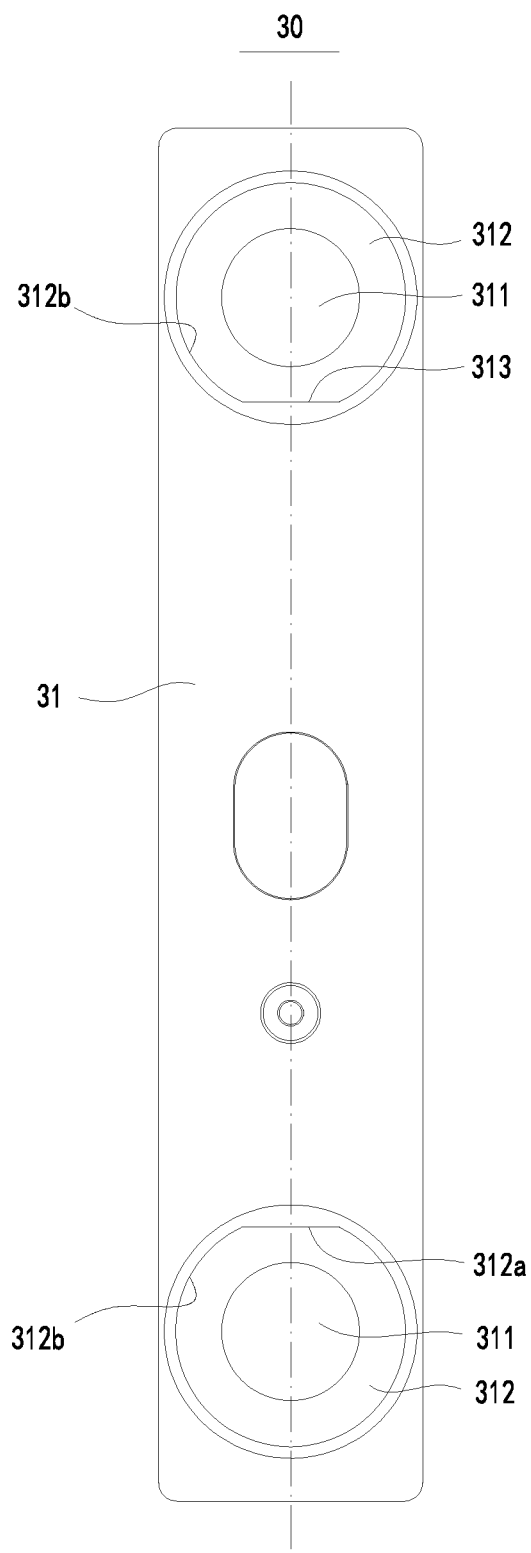
FIG. 10 is a top view schematically showing a configuration of a cap plate according to an embodiment of the present disclosure.

As shown in FIG. 3 and FIG. 10, the cap plate 31 of the present embodiment is provided with a groove 312. The second connecting portion 353 of the connecting member 35 is accommodated in the groove 312. The groove 312 includes a first planar surface 312a and a first arc surface 312b. As shown in FIG. 9, the second connecting portion 353 of the present embodiment includes a second planar surface 353a and a second arc surface 353b. After the second connecting portion 353 is engaged with the groove 312, the first planar surface 312a and the second planar surface 353a are abutted against each other, while the first arc surface 312b and the second arc surface 353b are abutted against each other, thereby preventing the connecting member 35 from rotating relative to the cap plate 31, and improving the connection stability between the connecting member 35 and the cap plate 31.

The cap assembly 30 according to the embodiment of the present application includes the isolating member 33 and the electrode terminal 32 connected with each other. The isolating member 33 is connected with the recess 322 provided on the electrode terminal 32 through the protrusion 34, so as to prevent the relative rotation between the isolating member 33 and the main body 321 and keep the relative positions of the isolating member 33 and the main body 321 unchanged, thereby ensuring the connection stability between the isolating member 33 and the main body 321. Meanwhile, since the recess 322 is provided on the side wall of the main body 321 of the electrode terminal 32, and the protrusion 34 engaged with the recess 322 is provided on the inner wall of the isolating member 33, it is advantageous to reduce the restraints and limitations on the radial dimension of the receiving portion 331 by the protrusion 34, which is conducive to increasing the radial dimension of the receiving portion 331 of the isolating member 33 and thus the radial dimension of the main body 321 of the electrode terminal 32, thereby improving the overcurrent capacity of the entire electrode terminal 32.

Although the present disclosure has been described with reference to preferred embodiments, various modifications can be made thereto and components therein can be replaced with equivalents without departing from the scope of the present disclosure. Especially, as long as there is no structural conflict, various technical features mentioned in various embodiments can be combined in any manner. The present disclosure is not limited to the specific embodiments disclosed herein, but includes all technical solutions falling within the scope of the claims.

What is claimed is:

1. A secondary battery, comprising:
a case provided with an opening;
an electrode assembly accommodated in the case; and,
a cap assembly, comprising:
a cap plate, provided with an electrode lead-out hole;
an electrode terminal, covering the electrode lead-out hole and comprising a main body, wherein the main body is located on a side of the cap plate facing away from an inner side of the secondary battery and provided with a recess on a side wall;
an isolating member located on the side of the cap plate facing away from the inner side of the secondary battery and comprising a receiving portion, wherein the main body is received in the receiving portion; and
a protrusion, connected to an inner wall of the isolating member and extending towards an axis of the electrode lead-out hole,
wherein the protrusion is received in the recess so as to prevent the main body from rotating relative to the isolating member,
wherein the cap assembly is configured to cover the opening to close the case with the electrode assembly therein,
wherein the main body is provided with a plurality of recesses spaced apart from each other on the side wall, and the number of the protrusions is equal to the number of the recesses, and
the cap assembly further comprises:
a sealing member, which is located on the side of the cap plate facing away from the inner side of the secondary battery and is disposed between the cap plate and the main body of the electrode terminal to keep sealing between them, and
a connecting piece for electrically connecting the electrode terminal with the electrode assembly, the connecting piece comprises a protruding portion, which extends into the electrode lead-out hole from the inner side of the secondary battery and is connected with the electrode terminal.

2. The secondary battery according to claim 1, wherein the recess is configured to extend through the main body in a thickness direction.

3. The secondary battery according to claim 1, wherein the main body is formed in a cylindrical shape.

4. The secondary battery according to claim 1, wherein the isolating member and the protrusion are integrally formed and are made of the same material.

5. The secondary battery according to claim 1, wherein the electrode terminal further comprises an external connection portion, which is located on a side of the main body facing away from the cap plate, and the main body extends beyond a peripheral surface of the external connection portion.

6. The secondary battery according to claim 1, wherein the isolating member is in contact with the main body, and in a thickness direction, a part of the isolating member is located on a side of the main body facing away from the cap plate so as to prevent the main body from moving in a direction away from the cap plate.

7. The secondary battery according to claim 1, wherein the cap assembly further comprises a connecting member, which is fixedly connected with the cap plate and is isolated from the main body through the isolating member, the connecting member comprises a first connecting portion located on a side of the main body facing away from the cap plate, and a part of the isolating member is located between the first connecting portion and the cap plate.

8. The secondary battery according to claim 7, wherein the connecting member further comprises an intermediate transition portion and a second connecting portion, the intermediate transition portion is connected between the first connecting portion and the second connecting portion, and the second connecting portion extends away from the main body.

9. The secondary battery according to claim 8, wherein the first connecting portion is formed in an annular shape, the intermediate transition portion is formed in a tubular shape, and the second connecting portion is formed in an annular shape.

10. The cap assembly secondary battery according to claim 8, wherein the cap plate is provided with a groove, and the second connecting portion is received in the groove, the groove comprises a first planar surface and a first arc surface, the second connecting portion comprises a second planar surface and a second arc surface, the first arc surface is engaged with the second arc surface while the first planar surface is connected to the second planar surface so as to prevent the connecting member from rotating relative to the cap plate.

11. The secondary battery according to claim 1, wherein the main body of the electrode terminal is does not extend into the electrode lead-out hole.

12. The secondary battery according to claim 1, wherein the recess is configured to not extend through the main body in a thickness direction, and the protrusion engages with the recess to apply a force towards the cap plate to the main body.

* * * * *